July 18, 1961

J. W. HOUGH 2,992,732

DENSE MEDIA SYSTEM FOR THE SEPARATION OF
SINK AND FLOAT MATERIALS

Filed July 18, 1957

INVENTOR
JOHN W. HOUGH

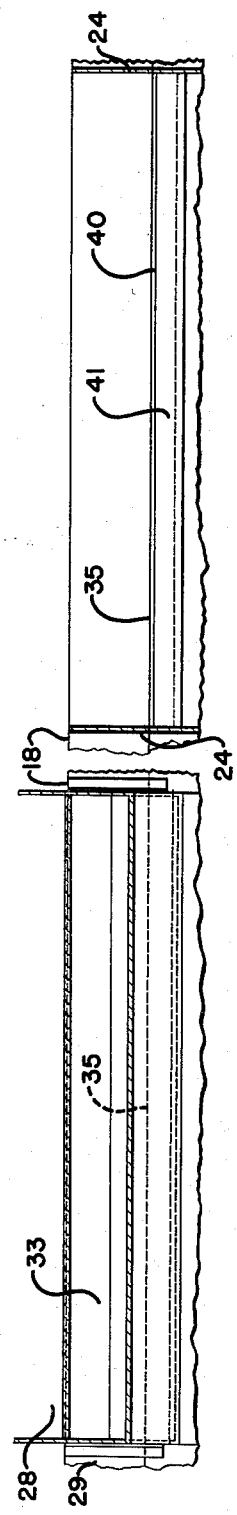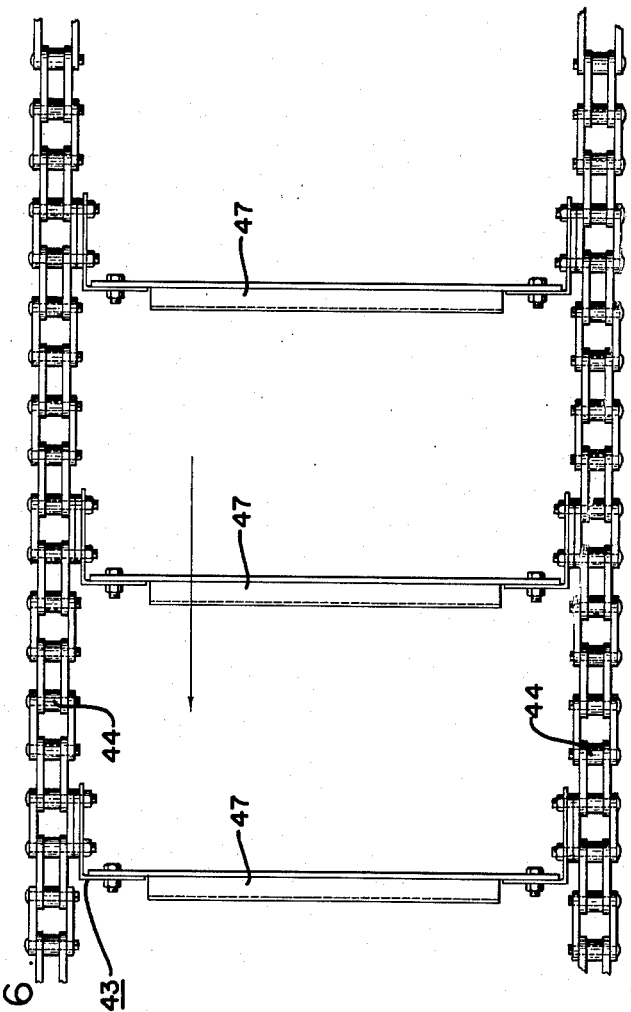

United States Patent Office 2,992,732
Patented July 18, 1961

2,992,732
DENSE MEDIA SYSTEM FOR THE SEPARATION OF SINK AND FLOAT MATERIALS
John W. Hough, Indiana, Pa., assignor to The Daniels Company, Contractors, Inc., Indiana, Pa., a corporation of Pennsylvania
Filed July 18, 1957, Ser. No. 672,673
3 Claims. (Cl. 209—172.5)

This invention relates to a new dense media system for the separation of sink and float materials in conjunction with the use of a liquid of controlled specific gravity such as a water suspension of finely divided magnetite, quartz sand or like-acting density regulating solid material. More particularly, this invention pertains to a novel apparatus and method for increasing the efficiency and effectiveness of dense media separations.

Dense media separator systems are utilizable in a variety of industries. In the coal industry, for example, dense media washers are employed to clean coal and separate it as a float material from slate and other refuse which is discharged as a sink material. In other fields such as the separation of valuable ores from gangue and other refuse of lower specific gravity, dense media concentrators are used in which the cleaned ore, which is the valuable component, is removed as the sink material and the refuse is removed in such case as the float in the dense media.

In sink and float separators, the efficiency of separation has heretofore been limited by the relatively lower capacity required for a prescribed weight specification in terms of objectionable material in the valuable end product component after separation. And, such separators have had to be run either at such relatively lower capacity or additional such separation stages have been required. In particular, in dense media washers for coal as heretofore practiced, a problem of "rafting" of finer sink particles by float material has existed with a consequence that either capacity limitation was accepted or more washing stages were resorted to for optimum operation.

The foregoing difficulties have been overcome by the new combination of my invention pursuant to which in a single stage in my new system, a material reduction is obtainable in terms of any residual quantity of refuse discharged with the valuable component. As a result, increased apparatus capacity, or cleaner desired end product, or both, are obtainable and among advantages achievable by a practice of my invention.

Other objects, features and advantages of this invention will be apparent from the following description and accompanying drawings, which are illustrative of one embodiment only, in which FIGURE 1 is a side view in elevation of one form of apparatus combination of my invention utilizable as a coal washing embodiment, said view being in section taken along line I—I of FIGURE 2;

FIGURE 4 is a detail view of the feed side of the device shown taken along line IV—IV of FIGURE 2;

FIGURE 5 is a detail view of the float discharge side taken along line V—V of FIGURE 2; and FIGURE 6 is a detail view of a part of an endless conveyor usable in the device shown taken along line VI—VI of FIGURE 1.

Figure 1:
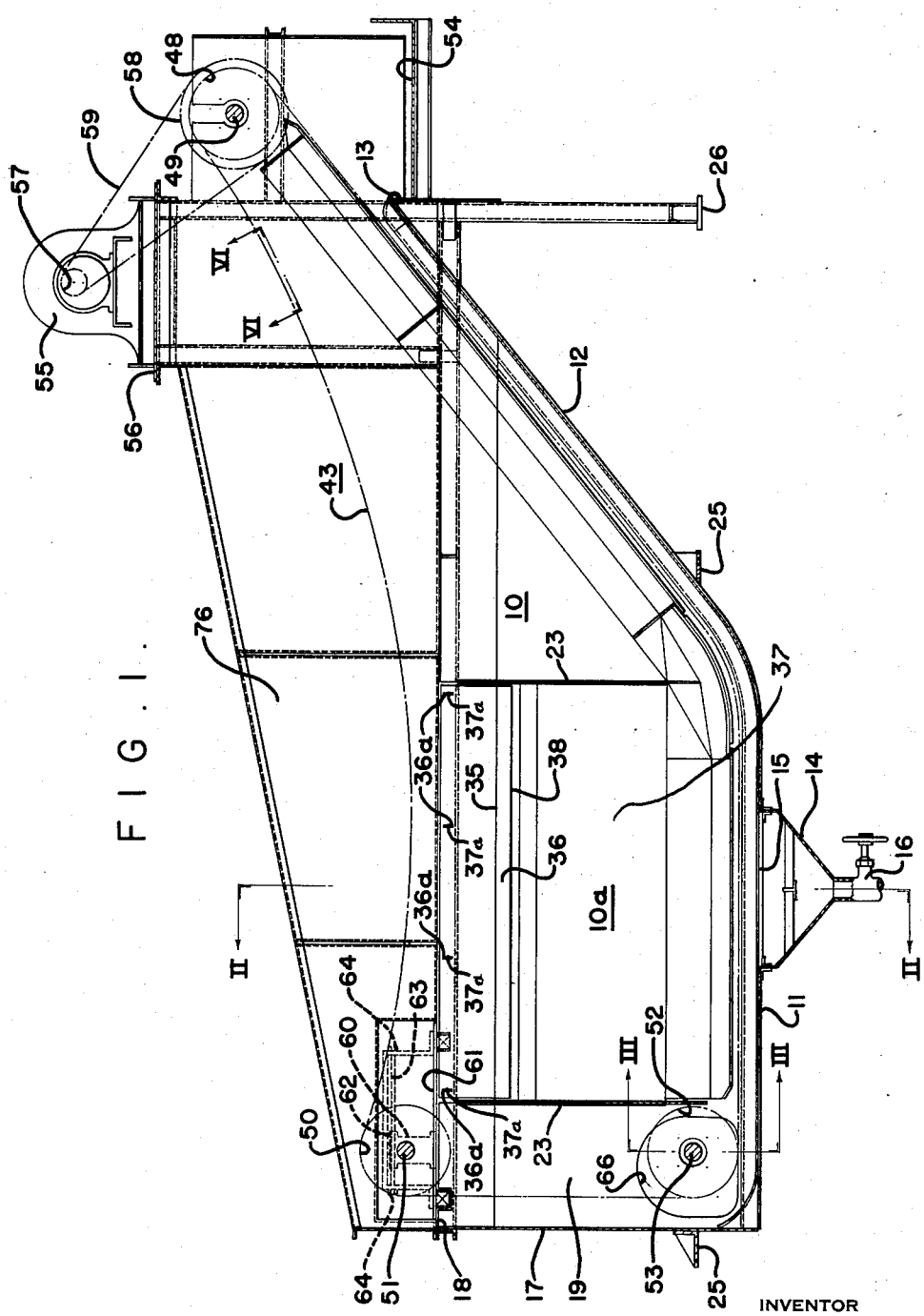
Figure 2:
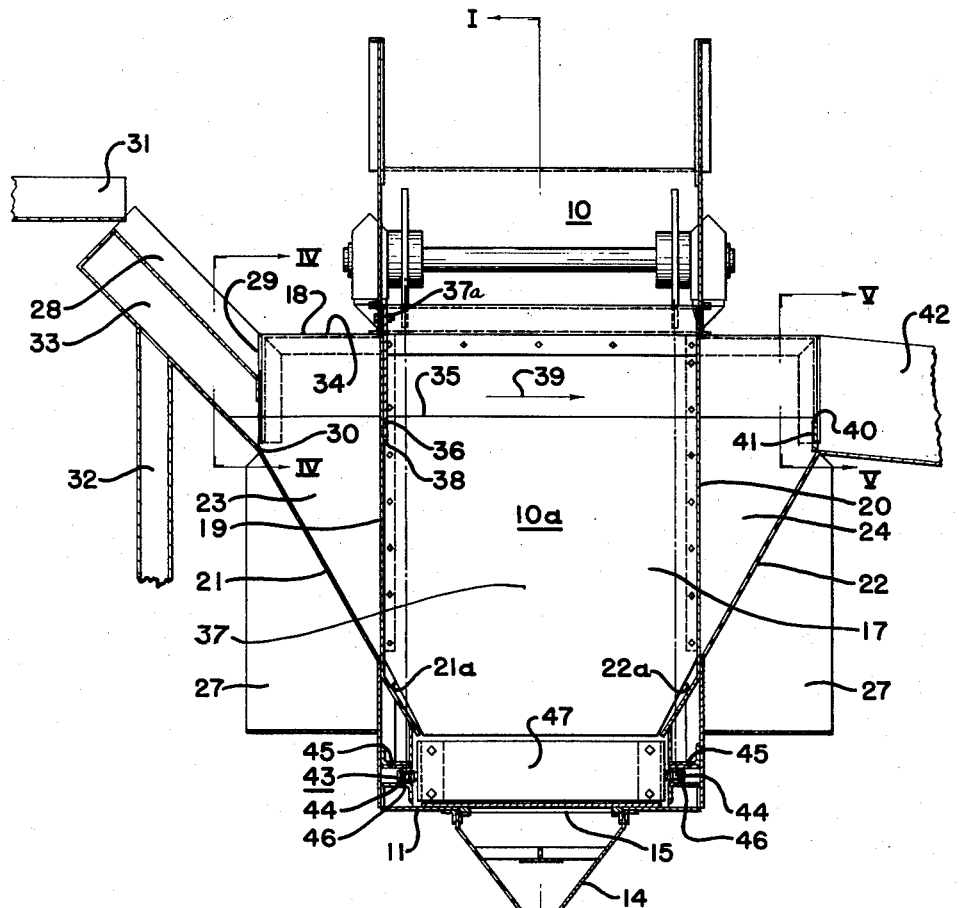
FIGURE 2 is a view in elevation taken along line II—II of FIGURE 1.
Figure 3:
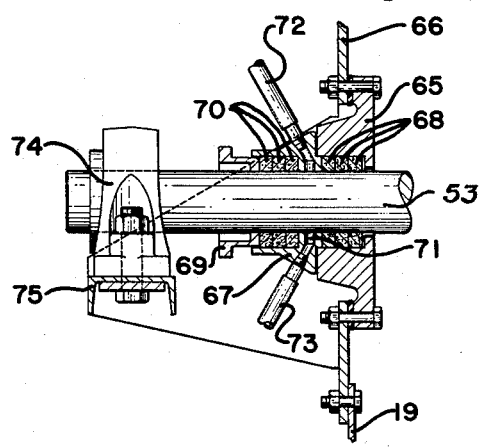
FIGURE 3 is a detail view in section of an outboard lower corner shaft bearing taken along line III—III of FIGURE 1.

Referring to a coal washer embodiment 10 shown in the drawings, there is therein a longitudinally extending tank 10a with a bottom having a flat portion 11 and an upwardly inclined portion 12 smoothly connected thereto and extending to an upper transverse edge 13 at one end of the tank. A funnel-like drain and purge port 14 is positioned beneath portion 11 and communicates with the interior of the tank through a screen 15 having perforations smaller than the size of the normal refuse which descends as sink material in the tank bottom in the course of an operation of washer 10. A valve 16, normally closed, is positioned in the outlet of port 14.

The other end 17 of the tank is generally vertical and extends upwardly to an upper edge 18 of the tank 10a, such upper edge 18 being lower than sink material discharge edge 13 in the embodiment shown. The tank of device 10 is completed by a feed side 19 and float discharge side 20, each of said sides having longitudinally extending non-flaring portions in alignment with the respective vertical edges of end 17. Intermediate the ends of the tank 10a, the sides have upwardly and outwardly flaring portions 21 and 22 respectively, the front and back spaces between the respective edges thereof and the vertical edges of the adjacent non-flaring portions of the sides respectively being closed by transverse gusset plates 23 and 24, to make tank 10a liquid-tight. Tank 10a may be fabricated from plates or sheets of metal with channels and angles for the structural members to be joined along the various corners and edges thereof.

Washer 10 is supported on an operating floor or other level by mounting members 25 and the columns 26, the portion between and below the mounting members 25 being accommodated in a pit or in a lower story when washer 10 is mounted above the ground in a structural framework or building. The flaring portions 21 and 22 are reinforced on the underside by buttress plates 27 connected to washer 10 in parallel arrangement.

A trough-shaped feed tray 28 is fixed to a face 29 of the feed zone above flaring portions 21 which has an upper edge 30. Tray 28 receives raw or run-of-mine coal from a lip 31 of the discharge apron, for example, of a pre-wet screen. Dense media, such as magnetite suspended in water, of a precisely controlled specific gravity is pumped through a pipe 32 into a conduit or box 33 positioned against the underside of tray 28 so that such media so supplied will run down into the tank 10a. Normally, the space 34 at the top of the flaring portion 21 is open between the gusset plates 23 so an observer may see the descent of raw sink-and-float material fed between the sides of face 29 from tray 28 into the media of controlled gravity from conduit 33. The dense media is maintained at a predetermined level such as that represented by the line 35.

A dip plate 36 is provided with a series of horizontally spaced vertically elongated openings 36a through which bolt and nut assembly 37a extends so that plate 36 can be affixed to the structure of the upper edge 18 on the feed side of washer 10 in generally longitudinal alignment with the non-flaring portions 19 of that feed side. Preferably, duck plate 36 extends across the entire width of the transverse passage opening from the feed zone above flaring portion 21 into the central portion 37 of tank 10a. The lower edge 38 of plate 36 is adjusted so as to extend slightly below the selected surface level 35 of the media in the tank 10a to cause material coming in contact therewith to duck below lower edge 38 upon reaching plate 36 in the course of the flow of media and material along the transverse passage in the direction of arrow 39. For most coal washing purposes, lower edge 38 may be set from one to two inches below liquid surface 35.

In the course of an operation of my new system and equipment, a great improvement in the effectiveness of separation is obtained between sink and float materials and it would appear that as the dip plate 36 causes all of the float materials to submerge in the course of the movement thereof along the transverse passage to the float discharge launder 42, relatively more complete separation is obtained and the phenomenon called "rafting" is markedly inhibited so that, in the case of a coal washer as described, refuse including that of finer sizes is removed from the float providing washed coal which is markedly cleaner and improved in efficiency and operating capacity.

The transverse passage for the flow of dense media and solids therein starts with the feed zone above the flaring side portion 21, extends across the tank in the central zone 37 and concludes in the discharge zone above the flaring side portion 22. During that passage, sink material settles to the bottom of the tank onto, for the most part, the flat portion 11. Float material on the other hand rides along with the surface portion of the dense media while in the process of becoming separated from sink material. Clean float material is discharged from the discharge zone over a longitudinally extending discharge edge 40. Discharge edge 40 may be the upper edge of a vertically adjustable weir plate 41 fastened to the upper edge of flaring side portion 22 of the tank structure. Vertical adjustment of plate 41 will regulate, under otherwise given conditions, the level 35 of the dense media passing across device 10 in the course of a separation action. Such dense media discharging over edge 40 contains float material which is in a clean condition and runs off in a launder trough 42 to a further item of equipment as a drainage screen where the clean coal is normally separated from the liquid media prior to its collection as clean washed coal in the case of the exemplary operation.

A chain conveyor 43 is provided in washer 10 to remove sink material therefrom in a continuous manner. Conveyor 43 is provided with two parallel endless link chains 44 separated by a width such that the links on each side remain in a channel defined by upper guides 45 and lower guides 46 along the sides of the bottom of the tank in washer 10. Shield plate extensions 21a and 22a for the respective flaring portions 21 and 22 of the sides direct sinking material to the bottom portion intermediate such channels. Such sink material is removed by engagement of scraper plates 47 fastened to and extending between respective links laterally opposite to one another on the respective chains 44.

The chains 44 are engaged respectively by drive sprockets 48 secured to a drive shaft 49, by take-up sprockets 50 mounted on an upper corner shaft 51 and by sprockets 52 mounted on a lower corner shaft 53. As shaft 49 rotates in a counterclockwise direction as viewed in FIGURE 1, the plates 47 which are maintained in a position normal to the bottom of the tank substantially scrape such bottom and move sink material deposited thereon along and upwardly over the inclined portion 12 of the bottom and into a trough 54 extending beneath discharge edge 13. Since discharge edge 13 is positioned above the edges 18, drainings from the sink material will run back into tank 10a. Shaft 49 may be driven by a fluid-coupled motor-speed-reducer combination 55 mounted on a platform 56 and connected to shaft 49 by means of pulleys 57 and 58 and a connecting belt 59. A sheet metal side and end enclosure 76 is fastened to the upper edges 18 of tank 10a and platform 56 is enclosed on the sides and one end to surround the upper reach of conveyor 43 as a guard.

Any take-up required in conveyor 43 may be obtained by movement of shaft 51 and the sprockets 50 longitudinally relative to tank 10a. The ends of shaft 51 are mounted in laterally spaced bearings 60 which are slidable along the longitudinally extending ways 61 mounted on the edges 18 of the sides of the tank adjacent vertical end 17 thereof. The upper portion of each bearing 60 is provided with a nut 62 which is engaged by a threaded adjustment rod 63 having a squared end 64 to be turned by a wrench. The rods 63 on each side are journaled at their respective ends for rotation but are axially immovable. Hence by turning the respective rods 63 in the appropriate direction, shaft 51 can be moved toward or away from end 17 to the desired extent necessary to provide the desired tensioning in conveyor 43.

Shaft 53 is the only shaft which is submerged in the course of operation and subject to the abrasive quality of the surrounding media and solids. In order to prevent abrasion of the journal ends of shaft 53, provision is made for the extension of each end thereof through a bushing plate 65 which is fastened in sealed relation to a mounting plate 66 in turn secured over an opening through the respective sides of the tank and made watertight by means of a gasket. A sealing ring 67 is secured to each plate 65 in such a manner as to provide a predetermined pressure upon the packing rings 68 between ring 67 and plate 65. In turn a stuffing box 69 is fastened to ring 67 so as to apply a somewhat greater pressure against the packing rings 70. The inner end of sealing ring 67 is provided with an annular channel 71 which is kept full of a sealing liquid like water, such liquid entering recess 71 through an inlet pipe 72 and leaving it by means of an outlet pipe 73. Because the force against the packing 68 is selectively less than that against packing 70, any leakage of fluid from annular recess 71 will be inwardly along shaft 53 between it and packing 68 into tank 10a of washer 10, thereby keeping the journal portions of the shaft 53 free of grit and abrasive material. The outermost ends of shaft 53 are supported in pillar block bearings 74 mounted on brackets 75 which are fastened to mounting plates 66 on opposite sides of the washer 10.

Various other embodiments of my invention and modification of details in the illustrated construction, as well as other uses of my new system, may be provided without departing from the spirit of my invention or the scope of the appended claims.

I claim:

1. In a dense media system to separate sink and float materials like coal and metalliferous ores, apparatus comprising, in combination, a longitudinally extending media holding tank having a bottom with flat and upwardly inclined portions, said upwardly inclined portion extending to a laterally extending discharge edge at one end thereof somewhat higher than the upper edges of the normal media holding portion of said tank, the other end of said tank being generally vertical and connected to the end of said flat portion of said bottom remote from said one end, the sides of said tank having generally vertical non-flaring portions and upwardly and laterally outwardly flaring portions intermediate the ends of said tank and adjacent said flat portion of said bottom, said flaring portions generally defining a feed zone and a discharge zone respectively, said zones being in transverse registry with a central zone to define a transverse passage through said tank having a longitudinally extending discharge edge in said discharge zone somewhat lower than said upper edges of said tank, a downwardly extending dip plate mounted on said tank at the feed side boundary of said central zone above said transverse passage in general longitudinal alignment with the non-flaring portion of that side of said tank proximate to said feed zone, the bottom edge of said dip plate being lower than but near the level of said longitudinal discharge edge and adapted to be submerged in said dense media, a weir defining said longitudinal discharge edge, an endless chain conveyor extending longitudinally in said tank and adapted to scrape sink material along the bottom of said tank to discharge it from said laterally extending discharge edge, said conveyor having perforated transverse blades, guide strips along the sides of the bottom of said central zone and non-flaring portions to hold said conveyor blades substantially in engagement with said bottom, lateral corner shaft and sprocket means in generally vertical arrangement at the upper and lower corners of said other end of said tank, said sprocket means at said power corner being the only such means below said level, said lower corner shaft being horizontal and having seals and bearings at the respective ends of said shaft, a lateral drive shaft and sprocket means adjacent the top of said one end, and means to drive said conveyor.

2. Dense media apparatus as set forth in claim 1, in which, said dip plate and weir are respectively vertically adjustable.

3. Dense media apparatus as set forth in claim 1, in which, said horizontal lower corner shaft has at least one end of said shaft extending through one wall of said tank, a stuffing box surrounding said end of said shaft and connected to said wall to preserve the liquid-tight integrity of said wall, said stuffing box enclosing axially spaced inner and outer annular packing portions, means for supplying lubricant to the interior of said stuffing box for said shaft between inner and outer packing portions, and means for holding said outer packing portion tighter around said shaft than said inner packing portion, whereby said shaft is protected against the entry of deleterious solids from said tank into said stuffing box, and a bearing for said end of said shaft outboard of said stuffing box.

References Cited in the file of this patent

UNITED STATES PATENTS

| | | |
|---|---|---|
| 332,675 | Ott | Dec. 15, 1885 |
| 1,776,974 | Henderson | Sept. 30, 1930 |
| 1,866,965 | Clement | July 12, 1932 |
| 2,000,293 | Morrow | May 7, 1935 |
| 2,189,418 | Finney | Feb. 6, 1940 |
| 2,318,524 | Read | May 4, 1943 |
| 2,496,703 | Ekbom | Feb. 7, 1950 |
| 2,530,676 | Berg | Nov. 21, 1950 |
| 2,711,822 | Novak | June 28, 1955 |
| 2,720,971 | Roller | Oct. 18, 1955 |
| 2,775,346 | Tromp | Dec. 25, 1956 |

UNITED STATES PATENT OFFICE

CERTIFICATE OF CORRECTION

Patent No. 2,992,732　　　　　　　　　　　　　　July 18, 1961

John W. Hough

It is hereby certified that error appears in the above numbered patent requiring correction and that the said Letters Patent should read as corrected below.

Column 2, line 8, for "in", first occurrence, read -- to --; line 29, strike out "the", first occurrence; column 5, line 3, for "power" read -- lower --.

Signed and sealed this 28th day of November 1961.

(SEAL)
Attest:

ERNEST W. SWIDER
Attesting Officer

DAVID L. LADD
Commissioner of Patents

USCOMM-DC